J. E. & C. C. HALSTED.
Seeder and Harrow.

No. 103,452.  Patented May 24, 1870.

Witnesses
J. V. White
Jno. A. Ellis.

Inventor
J. E. & C. C. Halsted
Per
T. H. Alexander
Atty

United States Patent Office.

JOHN E. HALSTED AND COLOPE C. HALSTED, OF BLOSSVALE, NEW YORK.

Letters Patent No. 103,452, dated May 24, 1870.

IMPROVED COMBINED SEEDER AND HARROW.

The Schedule referred to in these Letters Patent and making part of the same.

*To all whom it may concern:*

Be it known that we, JOHN E. HALSTED and COLOPE C. HALSTED, of Blossvale, in the county of Oneida and State of New York, have invented certain new and useful Improvements in Combined Seeder and Harrow; and we do hereby declare that the following is a full, clear, and exact description thereof, reference being had to the accompanying drawings and to the letters of reference marked thereon, which form a part of this specification.

The nature of our invention consists in the construction and arrangement of a seed-sower and harrow, as will be hereinafter more fully set forth.

In order to enable others skilled in the art to which our invention appertains to make and use the same, we will now proceed to describe its construction and operation, referring to the annexed drawings, in which—

Figure 1:
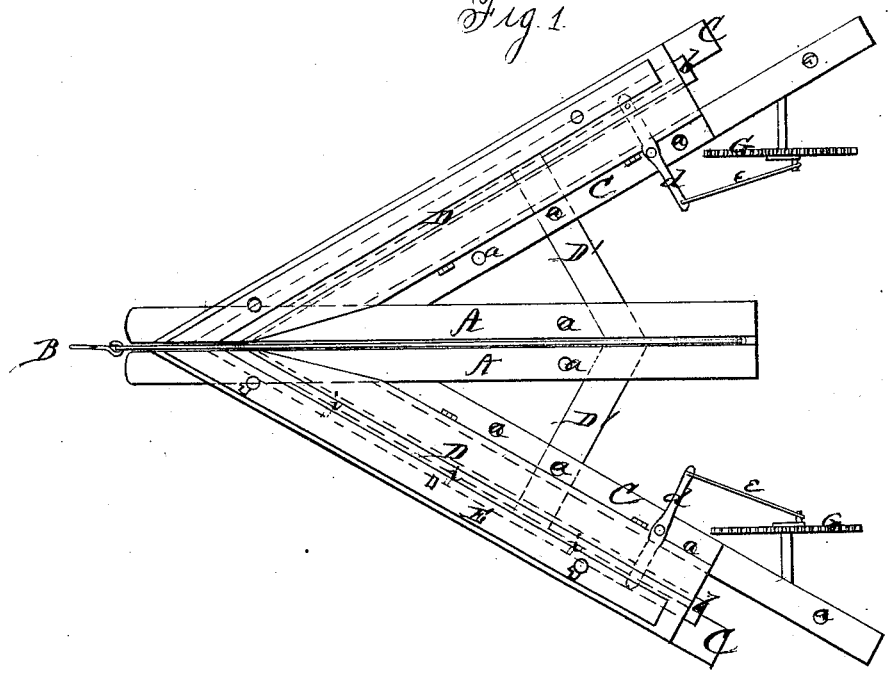
Figure 2:
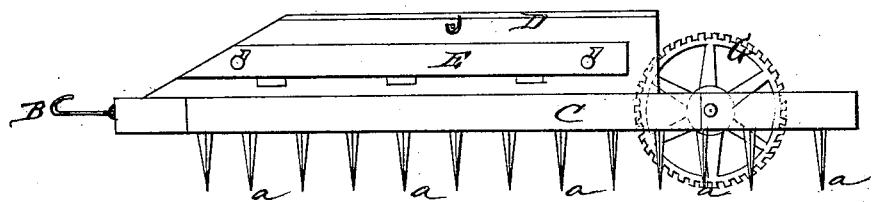

Figure 1 is a plan view, and
Figure 2, a side elevation of our machine.

A A represent two beams, placed side by side and hinged together, having between their front ends a clevis, B, for attaching the team.

At suitable points from the outside of each bar A are secured two parallel bars, C C, braced to the beam by the bar or brace D', thus forming two separate frames, hinged together in the center.

The bars C C, as well as the center beams A A, are provided with teeth $a\,a$, making it a complete harrow, adapted to any kind of ground—side-hill, up or down hill, or otherwise.

Upon the bars C C are placed the seed-boxes D D, which are sloping or inclined on their front sides, so they cannot, by any possible means, be torn off when meeting any obstructions. Their lower front edges are even with or slightly in front of the front sides of the front bars C. These boxes are, by partitions running crosswise, divided into compartments, so that, when either side is turned up or down from the horizontal, the seed will not fall from one end of the box to the other.

Each of said compartments has an opening in the front sloping side of the box, through which the seed is allowed to pass out, the size of said openings being regulated by a sliding bar, E, on the front side of the box.

In the bottom of each seed-box is a sliding bar, $b$, provided at its front edge with pins $i\,i$, one for each aperture, which, when said bar is moved from end to end, agitates the seed and prevents it from clogging, allowing it to pass out and fall to the ground.

This bar or shaker $b$ is operated by a pivoted lever, $d$, connected by a pitman, $e$, to a crank on the driving-wheel G, which is mounted upon an axle attached to the inner side of the rear bar C.

It will be seen that the boxes are so constructed as not to be in the way for raising either of the wings or frames, and they can readily be removed when it is desired to use the harrow without sowing.

Having thus fully described our invention,
What we claim as new, and desire to secure by Letters Patent, is—

1. The seed-boxes D D, side bars C C, braces D' D', and hinged beams A A, all combined and arranged substantially as and for the purpose set forth.

2. The combination of the hinged wings A C D', teeth $a\,a$, boxes D D, regulating bars E E, shakers $b\,b$, levers $d\,d$, pitmen $e\,e$, and wheels G G, all constructed and arranged to operate substantially as and for the purposes herein set forth.

In testimony that we claim the foregoing as our own, we affix our signatures in presence of two witnesses.

JOHN E. HALSTED.
COLOPE C. HALSTED.

Witnesses:
JOHN FERGUSON,
W. J. LASHER.